United States Patent [19]

Casement et al.

[11] Patent Number: 5,800,180
[45] Date of Patent: Sep. 1, 1998

[54] HUMAN PRE-NATAL DEVELOPMENT DOLL JEWELRY

[76] Inventors: Jeffrey L. Casement; Lisa E. Malloy, both of P.O. Box 903, La Veta, Colo. 81055

[21] Appl. No.: 854,616

[22] Filed: May 12, 1997

Related U.S. Application Data

[63] Continuation-in-part of Ser. No. 674,132, Jul. 1, 1996, Pat. No. 5,672,058, which is a continuation-in-part of Ser. No. 352,873, Dec. 12, 1994, abandoned.

[51] Int. Cl.$^6$ ............................ G09B 23/28; A44C 25/00
[52] U.S. Cl. ........................ 434/267; 63/33; D11/83
[58] Field of Search ........................... 434/262, 267, 434/273, 295, 433; 63/3, 12, 20, 23, 33; D11/14, 31, 32, 44, 53, 83, 82, 100, 101

[56] References Cited

U.S. PATENT DOCUMENTS

| | | |
|---|---|---|
| D. 31,062 | 6/1899 | Forsheim . |
| D. 342,919 | 1/1994 | Levy ....................... D11/101 |
| D. 347,655 | 6/1994 | Munro . |
| 1,783,223 | 12/1930 | Dauer . |
| 3,699,707 | 10/1972 | Sapkus . |
| 3,797,130 | 3/1974 | Knapp et al. . |
| 3,822,486 | 7/1974 | Knapp et al. . |
| 3,824,709 | 7/1974 | Knapp et al. . |
| 3,826,019 | 7/1974 | Knapp et al. . |
| 4,197,670 | 4/1980 | Cox . |
| 4,411,629 | 10/1983 | Voights . |
| 5,004,442 | 4/1991 | Lemelson et al. . |
| 5,104,328 | 4/1992 | Lounsbury . |
| 5,207,728 | 5/1993 | Fogarty et al. . |
| 5,230,631 | 7/1993 | Halmaghi et al. ................. 434/284 |
| 5,256,098 | 10/1993 | Smith et al. . |
| 5,672,058 | 9/1997 | Casement et al. ................. 434/267 |

FOREIGN PATENT DOCUMENTS

2060412  6/1980  United Kingdom .

*Primary Examiner*—Jeffrey A. Smith

[57] ABSTRACT

A set of jewelry charms for personal ornamentation, educational and play purposes in the image of a human gametes and human fetuses. The charm can be provided singly to portray one particular state of human development, or multiple charms can be provided in a variety of stages of development, to portray continual development in the fertilization stage and first through third trimesters of development.

17 Claims, 5 Drawing Sheets

HUMAN PRE-NATAL DEVELOPMENT DOLL JEWELRY

FIELD OF THE INVENTION

This application is a continuation-in-part of our application, 08/674,132, filed Jul. 1, 1996 (now U.S. Pat. No. 5,672,058), which is a continuation-in-part of our application Ser. No. 08/352,873, filed Dec. 12, 1994 (now abandoned).

This invention relates generally to jewelry, play and educational toys and in particular to jewelry charms.

Dolls have always represented an excellent way to teach and educate youngsters while affording youngsters a way to play and amuse themselves. When a youngster plays with a doll, their senses, awareness, knowledge and perceptions are stimulated, as well as their imaginations. For many years, of course, dolls have been created that are intended to simulate young children and babies, On a limited scale, dolls of fetuses at or near term have been created to aid in the education and training of the childbirth process, for example U.S. Pat. No. 4,411,629 issued to Voights, as a way of teaching palpation and auscultation of a fetus in a pregnant female. However, there has not been one or more dolls that to any realistic extent portrays the pre-natal development of humans at any significantly earlier stage of development than the fetal stage or at or near term. In particular, there have been no known dolls of pre-fetal stages such as embryos stage or earlier, or of pre-fertilization stage. The present invention meets this need by providing various stages of development, from pre-fertilization gametes, to zygotes, to embryos, and through fetuses to term. When considered together, the dolls of the present invention can show or teach this development. A strong, positive educational impression can be made, conveying the importance of how quickly fertilization progresses and how the embryo and then the fetus achieves human form with human characteristics.

We particularly emphasize that the dolls of the present invention can also be fashioned into figurines or jewelry charms for personal ornamentation purposes. Such charms have all of the three-dimensional attributes of play dolls, but are on a scale of size suitable for use as jewelry, but are generally made of a precious or semi-precious material.

SUMMARY OF THE INVENTION

In summary, the invention is, in one of its preferred embodiments, a doll for play or educational purposes, comprising a manufactured doll having an exterior appearance sufficient to portray a human gamete, zygote, embryo or fetus, being in a stage of development during human pregnancy, at a point ranging from pre-fertilization to a point prior to full term. An alternative embodiment of the invention comprises a set of dolls for play or educational purposes, comprising a set of dolls having differing exterior appearances sufficient to portray a human development sequence from gamete stage prior to fertilization through progressively different states of development during human pregnancy at a set of points prior to full term. In its most preferred embodiment, the dolls are in the form of jewelry charms suitable for personal ornamentation.

DESCRIPTION OF THE PREFERRED EMBODIMENTS

Figure 1:
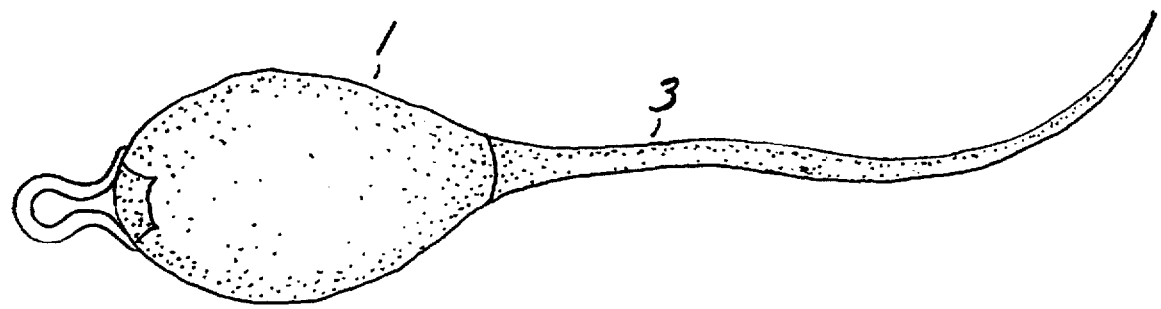
FIG. 1 is a side elevational view of a human sperm charm.
Figure 2:
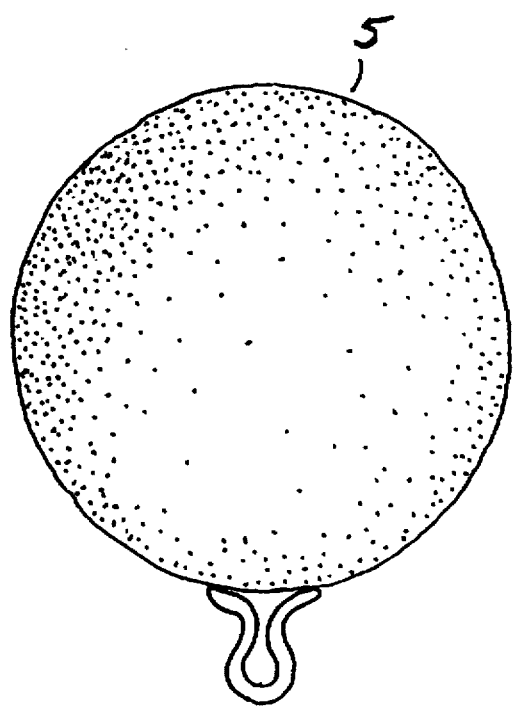
FIG. 2 is a side elevational view of a human egg charm.

The human pre-natal development charms of the present invention take as their models stages of human development including human gametes, zygotes, blastulas, gastrulas, morulas, embryos and fetuses at times of from just prior to fertilization to a time just prior to birth. Human gametes comprise a sperm and an egg or ovum, and charms representing them are shown respectively in FIGS. 1 and 2. These charms are meant to clearly show a separate and distinct stage in the complete development process. FIG. 1 shows a human sperm 1, having an optional mechanically detachable tail 3, which is an aid in depicting the loss of the sperm's tail after the sperm fertilizes a human ovum or egg 5. An additional feature of the sperm charm is a fastening means that permits the depiction of a sperm becoming fastened onto an egg charm.

Figure 3:
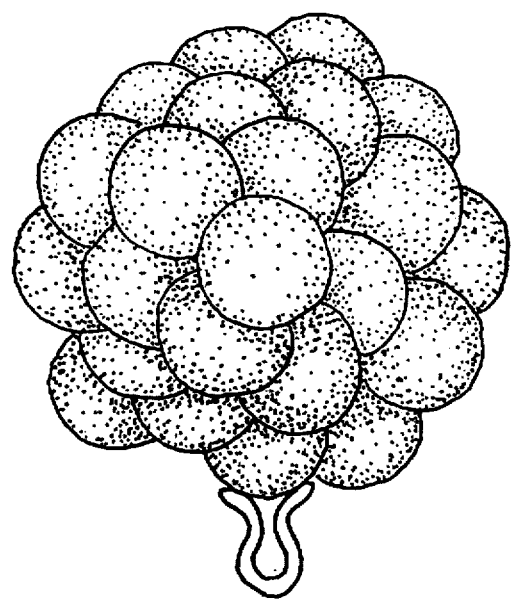
FIG. 3 is a side elevational view of a fertilized zygote charm.
Figure 4:
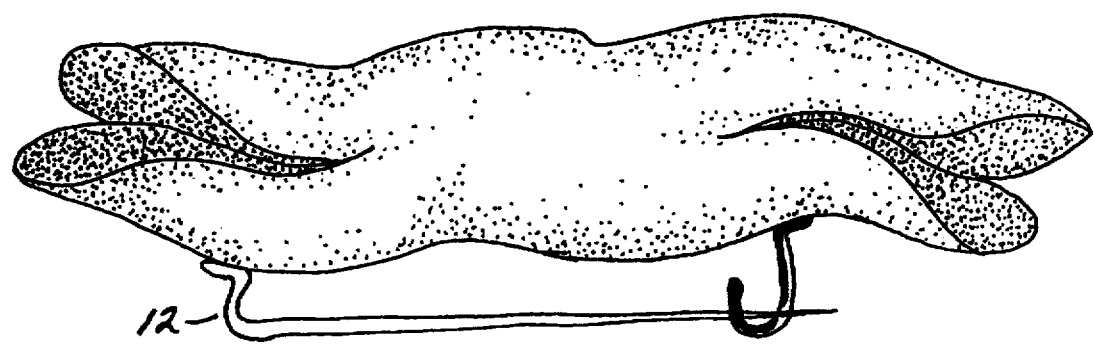
FIG. 4 is a side elevational view of a human embryo charm at an early embryonic stage showing early bilateral development of a neural tube.

In the next distinct stage, a zygote is the fertilized egg that has undergone one or more cycles of undifferentiated cellular reproduction, slowly taking on a spherical shape, as illustrated by the charm in FIG. 3. Beyond the initial zygote stage, development progresses through blastula, gastrula and morula stages, jewelry charm depictions of which are also part of the invention as claimed.

While the differentiation between the gamete stage and the zygote stage is readily apparent, it is important to know that there is also a differentiation between the embryo and fetus stage. Embryos and fetuses are differentiated by those of skill in the art such that up to eight weeks, the developing organism is classified as an embryo and after eight weeks, it is classified as a fetus. See *A Child Is Born*, Lennart Nilsson, Dell Publishing, New York, 1993 at page 91, the entire disclosure of which is incorporated herein by reference. Differentiation between development stages is very important in the practice of the invention. The differentiation between the embryo and fetus stages in the charms is critical to the education of wearers of the charms or users of the dolls in order to teach this recognized dichotomy of development stages.

Figure 5:
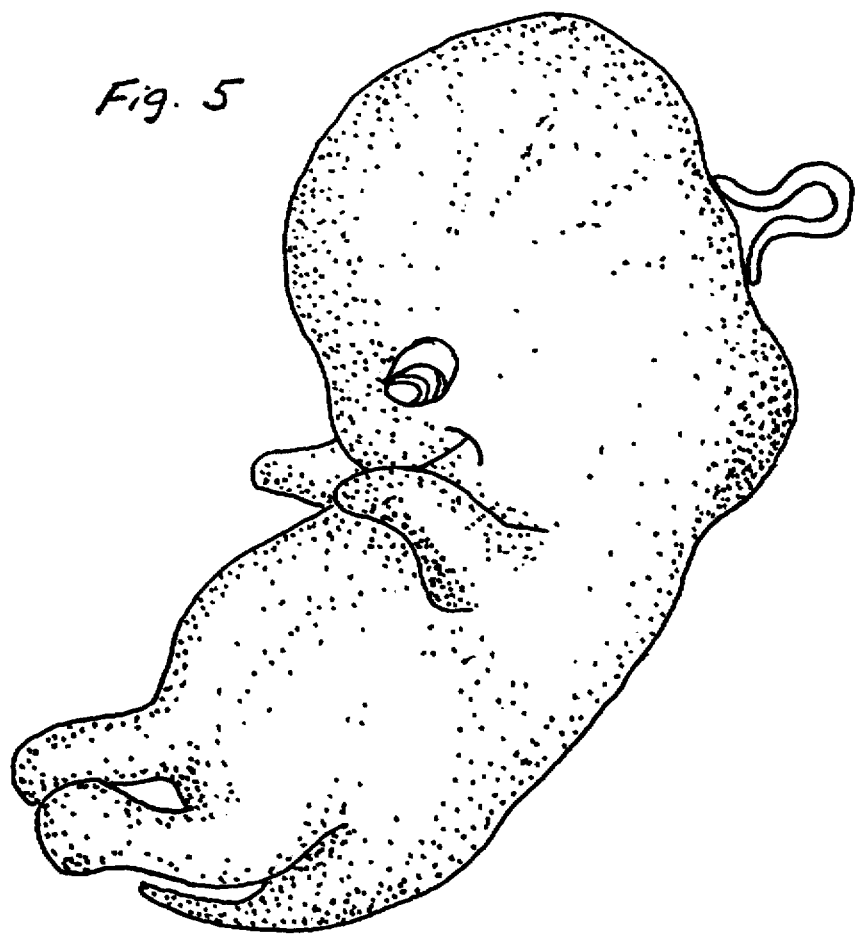
FIG. 5 is a side elevational view of an embryo charm at days 40 to 42 of development.
Figure 6:
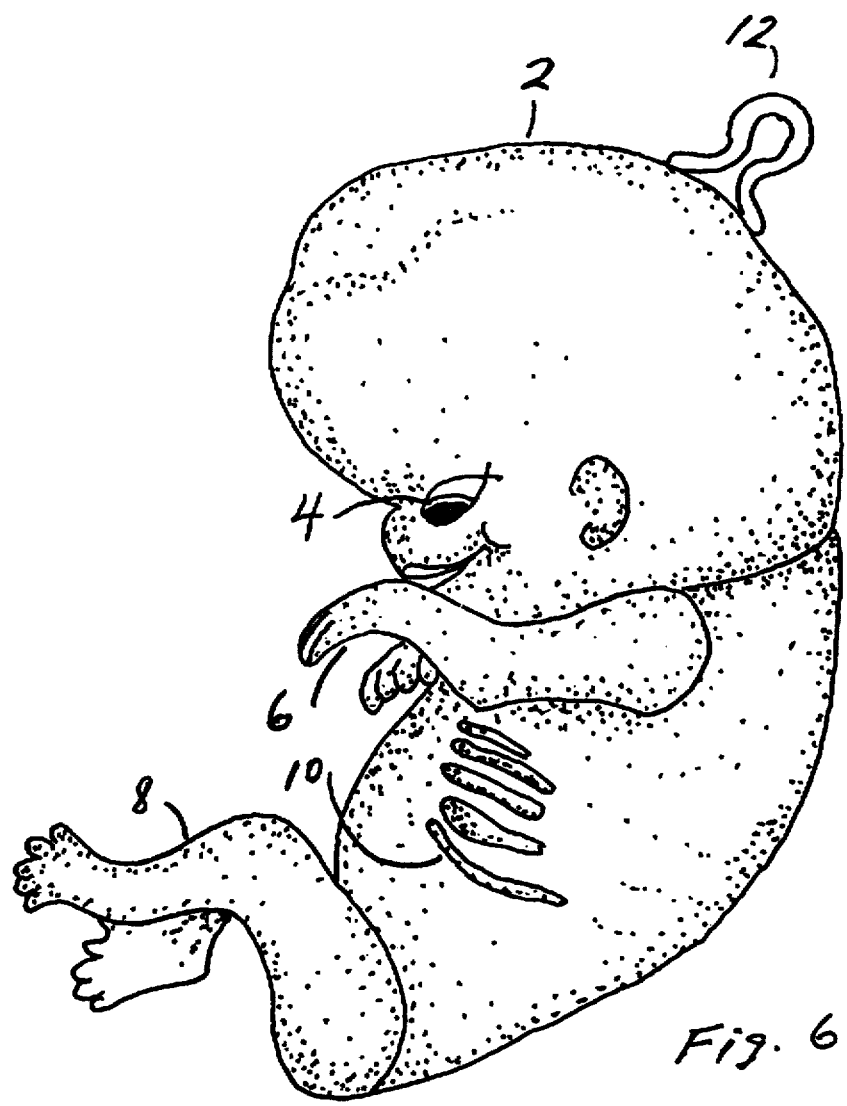
FIG. 6 is a perspective view of a fetus charm at days 44 to 46 of development.
Figure 7:
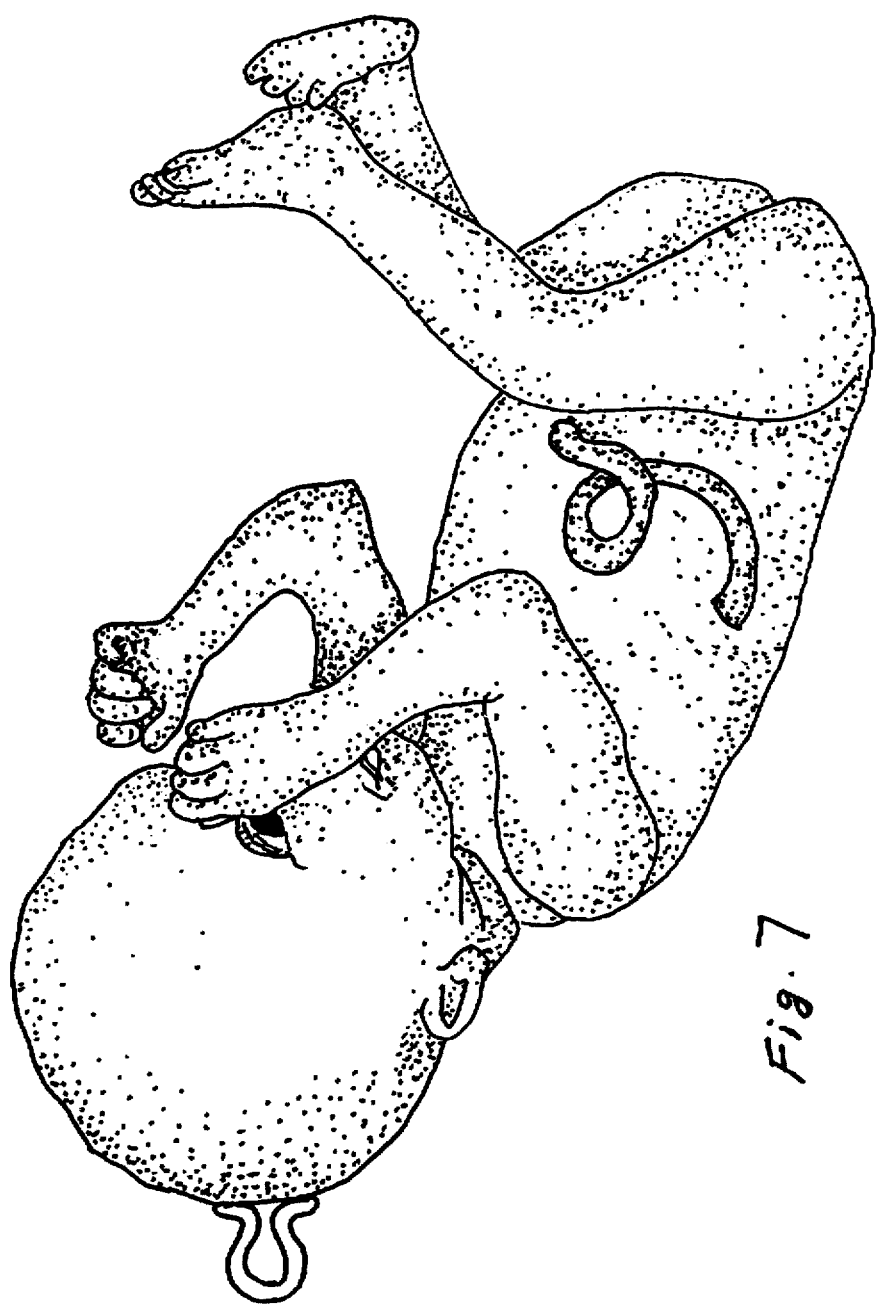
FIG. 7 is a side elevational view of a fetus charm at the twentysixth week of development.

As an aid in the making of the invention, there now follows a discussion of the appearance of various anatomical features as an embryo or fetus developes. In an embryo of up to day thirty-nine, the face is not generally recognizable as human. However, since one object of the invention is to provide charms for personal ornament (the term 'ornament' here is not used in the sense of claiming ornamental features of an article of manufacture), stylized faces can be built-in features of dolls of the human sperm, egg and zygote, as is shown in the drawings of this specification. As can be seen in FIG. 5, there are few features suggestive of a human at days forty to forty two of gestation, although the earliest indication suggestive of a human face develops over a continuum of days forty to forty-six of gestation. A fetal charm that can more accurately portray a human face would be an image at days forty four to forty six, as shown at FIG. 6. There, such features become visible as head 2, eyes 4, arms 6 and legs 8. Also the first faint outline of bones such as ribs 10 can be seen.

By the time of the 9th week of development, there can be seen a clearly demarcated mouth and nose and a bud that can be recognized as an ear. Although not illustrated, fingernails also appear at about this time. Also at this time, well separated fingers and toes are present.

By week 13, blood vessels are easily distinguished, especially in the region of the head. At this time, the fetus may be sucking its thumb, which is readily achievable in the charms of the present invention by means of articulated joints of the kind well known in the jewelry art. By week 20 even eyebrows are well developed. Although the models for the charms of the present invention are human gametes and embryos in various stages of development, it should be recognized that the invention is not that of a charm taken from a human in any one point of the development process, so none of the specific features of embryos at given times of development is to be taken as limiting the invention.

A non-limiting list of materials suitable for the practice of the preferred embodiments of the invention include pewter, silver, copper, gold, platinum, titanium, nickel, bronze, brass, stainless steel, ceramics, porcelain, polymers and the like. Certain types of birth defects can be exemplified, as well as developmental abnormalities, such as the occurrence of Siamese twins. The charms are generally not to scale, with fetuses in the early states, like days 44 to 46, only being about 27 millimeters from the crown of the head to the bottom of the rump.

The charms of the invention are attached to auxiliary jewelry pieces such as ornamental chains or to clothing or worn directly on one's person, by means of jewelry attachment means 12 as illustrated. The use of the term "charm" herein includes articles of jewelry in the form of or attached onto, bracelets, necklaces, earrings, brooches, pins, pendants, rings and so forth. Also included within this definition are free standing figurines.

Methods of manufacturing the charms include any methodology well known to those in the jewelry manufacturing art or the polymer molding art.

While the invention has been described and illustrated with reference to certain preparative embodiments thereof, those skilled in the art will appreciate that various changes, modifications and substitutions can be made therein without departing from the spirit and scope of the invention. It is to be particularly noted that although only a relatively limited number of drawings are given to illustrate a limited number of development times before and during pregnancy, that human development is a constant process and that the invention is of charms depicting stages through a continuous range of the development process. The claims are thus not to be limited to only those discrete points in the development process actually illustrated here.

What is claimed is:

1. A set of jewelry charms for ornamental, play or educational purposes, said set comprising a plurality of charms, one or more of said charms for portraying a human gamete, zygote, or embryo, each of said plurality of charms having a differing exterior appearance from others of said plurality of charms, having differing exterior appearances sufficient to portray a human prenatal development sequence from gamete stage prior to fertilization through progressively different states of development during human pregnancy at a set of points prior to full term.

2. The set as claimed in claim 1, wherein said set includes a charm which portrays a human sperm.

3. The charm as claimed in claim 2, which further comprises means for attaching said charm to another charm in the image of a human egg.

4. The set as claimed in claim 1, wherein said set includes a charm which portrays a human egg.

5. The set as claimed in claim 1, wherein said set includes a charm which portrays a fertilized human zygote.

6. The set as claimed in claim 1, wherein said set includes a charm which portrays a human pre-embryo selected from the group consisting of morula, blastula or gastrula stage.

7. The set as claimed in claim 1, wherein said set includes a charm which portrays a human embryo, being in a stage of development during the sixth week of pregnancy.

8. The set as claimed in claim 1, wherein said set includes a charm which portrays a human embryo, being in a stage of development during the seventh week of pregnancy.

9. The set as claimed in claim 1, wherein said set includes a charm which portrays a human embryo, being in a stage of development during the eighth week of pregnancy.

10. The set as claimed in claim 1, wherein said set includes a charm which portrays a human fetus, being in a stage of development during the ninth week of pregnancy.

11. The set as claimed in claim 1, wherein said set includes a charm which portrays a human fetus, being in a stage of development during the tenth week of pregnancy.

12. The set as claimed in claim 1, wherein said set includes a charm which portrays a human fetus, being in a stage of development during the twelfth week of pregnancy.

13. The set as claimed in claim 1, wherein said set includes a charm which portrays a human fetus, being in a stage of development during the thirteenth week of pregnancy.

14. The set as claimed in claim 1, wherein said set includes a charm which portrays a human fetus, being in a stage of development during the sixteenth week of pregnancy.

15. The set as claimed in claim 1, wherein said set includes a charm which portrays a human fetus, being in a stage of development during the twentieth week of pregnancy.

16. The set as claimed in claim 1, wherein said set includes a charm which portrays a human fetus, being in a stage of development during the twenty sixth week of pregnancy.

17. The set as claimed in claim 1, wherein said set includes a charm which portrays a human fetus, being in a stage of development during the thirty sixth week of pregnancy.

* * * * *